(12) United States Patent
Nagao et al.

(10) Patent No.: US 6,433,944 B1
(45) Date of Patent: Aug. 13, 2002

(54) MASTER CARRIER FOR MAGNETIC TRANSFER AND METHOD FOR TRANSFER

(75) Inventors: Makoto Nagao; Kazutoshi Katayama, both of Odawara; Ryuji Sugita, Hitachi, all of (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/401,961

(22) Filed: Sep. 22, 1999

(30) Foreign Application Priority Data

| Sep. 25, 1998 | (JP) | 10-270725 |
| Sep. 25, 1998 | (JP) | 10-270726 |
| Sep. 25, 1998 | (JP) | 10-270727 |
| Dec. 24, 1998 | (JP) | 10-367426 |
| Dec. 24, 1998 | (JP) | 10-367427 |
| Dec. 24, 1998 | (JP) | 10-367428 |
| Mar. 17, 1999 | (JP) | 11-071793 |

(51) Int. Cl.[7] ............................................... G11B 5/86
(52) U.S. Cl. ..................... 360/16; 360/17; 360/131; 428/694 T
(58) Field of Search .......................... 360/16, 17, 15, 360/55, 131, 135; 369/84; 428/694 T, 694 TR, 694 BR, 694 BN, 694 TS, 694 PR, 694 TC

(56) References Cited

U.S. PATENT DOCUMENTS

| 3,869,711 A | * | 3/1975 | Bernard et al. ................ 360/17 |
| 4,422,106 A | * | 12/1983 | Sawazaki ....................... 360/17 |
| 4,802,050 A | * | 1/1989 | Miyabayashi et al. ....... 360/131 |
| 5,303,092 A | * | 4/1994 | Noda ........................... 360/17 |
| 5,958,542 A | | 9/1999 | Ootake et al. |

FOREIGN PATENT DOCUMENTS

JP    10-010544    1/1998

* cited by examiner

Primary Examiner—Alan T. Faber
(74) Attorney, Agent, or Firm—Sughrue Mion, PLLC

(57) ABSTRACT

The present invention provides a master carrier for magnetic transfer, comprising a plurality of transfer information recording sectors having recording information magnetized thereon, a non-magnetic-material sector defining each of the transfer information recording sectors is present between each of adjacent transfer information recording sectors, and surfaces of the transfer information recording sectors and surfaces of the non-magnetic material sectors are positioned on and form the same plane.

17 Claims, 8 Drawing Sheets

MASTER CARRIER FOR MAGNETIC TRANSFER AND METHOD FOR TRANSFER

BACKGROUND OF THE INVENTION

The present invention relates to a master carrier for magnetic transfer used for transfer of recorded information to a magnetic recording medium in a magnetic recording and reproducing apparatus of large capacity and high recording density, and in particular, to a master carrier for magnetic transfer and a method for transfer used for recording of servo signals, address signals, other normal video signals and audio signals, data signals, etc. to a magnetic recording medium of large capacity and high recording density.

With rapid progress and development of the use of digital images, the amount of information to be handled by personal computer or other devices is extensively increasing. With the increase of the amount of information or information content, there are strong demands on a magnetic recording medium, which has large capacity to record information, is available at lower cost and requires shorter time for recording and reading.

In a high density recording medium such as hard disk or in a large capacity removable type magnetic recording medium such as ZIP (Iomega Inc.), information recording area comprises narrower tracks compared with floppy disk. In order to scan the magnetic head accurately along the narrow tracks and to perform recording and reproduction of signals at high S/N ratio, it is necessary to carry out accurate scanning using tracking servo technique.

In a large capacity magnetic recording medium such as hard disk or removable type magnetic recording medium, there is provided a recording area where servo signals for tracking, address information signals, reproducing clock signals, etc. are recorded at a constant angular interval for each turn of the disk. The magnetic head scans over the track accurately while confirming and correcting the position of the head by reproducing these signals at a predetermined interval. These signals are recorded on the magnetic recording medium in advance during the manufacturing process of the magnetic recording medium, and this is called "preformat".

Because positioning accuracy is required for the recording of servo signals for tracking, address information signals, reproducing clock signals, etc., the preformat recording is carried out by the magnetic head with its position strictly controlled by a special-purpose servo recording system after the magnetic recording medium has been incorporated into the drive.

However, in the preformat recording of the servo signals, address information signals, reproducing clock signals, etc. by the magnetic head, recording is performed while the position of the magnetic head is strictly controlled by the special-purpose servo recording system, and this means that much time is required for the preformat recording. Also, with the increase of magnetic recording density, amount of signals to be recorded by the preformat recording increases, and this requires much more time.

Further, there are disadvantages in that transition of magnetization at the end of the track recorded by the preformat recording lacks steepness or sharpness because of the spacing between the head and the magnetic recording medium and because of spreading of the recording magnetic field caused by the shape of the recording head.

Also, when information is transferred from the master carrier for magnetic transfer, the external field having coercive force more than 3 times as high as that of the recording medium must be used so that the magnetization on the master carrier for magnetic transfer may not be demagnetized when excitation is performed by applying external magnetic field.

When a magnetic material in planar shape is partially magnetized, coercive force of the master carrier will be more than 6000 Oe because coercive force of the magnetic material used in the recording medium for high density recording is about 2000 Oe, and it is practically impossible to perform accurate magnetization by the magnetic head.

To solve these problems, the following method has been proposed in JP-A-10-010544: This is a method, which comprises the steps of forming irregularities, i.e. projections and recesses, to match information signals on the surface of a base material, bringing at least surface of a master carrier for magnetic transfer having ferromagnetic thin film formed on surface of the projections of the surface irregularities into contact with surfaces of sheet-like or disk-like magnetic recording medium having ferromagnetic thin film or ferromagnetic powder coating layer formed on it, or applying DC magnetic field to excite ferromagnetic material on the surface of the projections, and recording magnetization pattern corresponding to surface irregularities, or projections and recesses.

This is a method to form a predetermined format on the slave medium by bringing surface of the projections of the master carrier into contact with the magnetic recording medium to be preformatted, i.e. the slave medium, and by exciting the ferromagnetic material of the projections. It is possible to statically perform the recording without changing relative positions of the master carrier and the slave medium, and accurate preformat recording can be accomplished. Moreover, the time required for the recording is very short. That is, in the method for recording from the magnetic head as already described, the time required is usually several minutes to several tens of minutes, and the time required for the recording must be extended more in proportion to the recording capacity. However, in the magnetic transfer method, transfer operation can be completed within less than one second regardless of recording capacity or recording density.

In this recording method, when number of sheets to be recorded is not many, recording with high accuracy can be achieved. But, when the preformat is performed for a number of slave media, disturbance may occur on angular portions of the information recording area of the master carrier for magnetic transfer, or recording on the slave medium may be damaged, and it is difficult to perform recording on a number of sheets.

SUMMARY OF THE INVENTION

The present invention provides a master carrier for magnetic transfer to transfer recording information to a magnetic recording medium, said master carrier comprises a plurality of transfer information recording sectors made of ferromagnetic substance corresponding to the recording information to be transferred, non-magnetic material sectors to define the transfer information recording sectors are present between adjacent transfer information recording sectors, and surfaces of the transfer information recording sectors and surfaces of the non-magnetic material sectors are substantially positioned on and forming the same plane.

Also, the present invention provides the master carrier for magnetic transfer as described above, wherein thickness of each of the transfer information recording sectors is 20 to 1000 nm.

Further, the present invention provides the master carrier for magnetic transfer as described above, wherein said transfer information recording sector has coercive force (Hc) of not higher than 2500 Oe.

The present invention also provides the master carrier for magnetic transfer as described above, wherein said transfer information recording sector has saturation magnetic flux density (Bs) of not less than 0.3 T.

The present invention further provides the master carrier for magnetic transfer as described above, wherein said master carrier comprises a plurality of transfer information recording sectors made of ferromagnetic substance corresponding to the recording information to be transferred and being in form of projections on a substrate, and non-magnetic conductive layers formed between the transfer information recording sectors and the substrate.

Further, the present invention provides the master carrier for magnetic transfer as described above, wherein the conductive layer comprises non-magnetic metal.

Also, the present invention provides the master carrier for magnetic transfer as described above, wherein a protective film is formed on the surface of the transfer information recording sectors.

The present invention also provides the master carrier for magnetic transfer as described above, wherein said master carrier comprises a plurality of transfer information recording sectors made of ferromagnetic substance corresponding to the recording information to be transferred and being formed on a substrate, a space or a non-magnetic sector is present between each of the adjacent transfer information recording sectors, surface hardness of each of the transfer information recording sectors is not lower than 20 GPa, and a diamond-like carbon protective film of 3 to 30 nm in thickness is provided on the surface.

Further, the present invention provides the master carrier for magnetic transfer as described above, wherein the ferromagnetic substance is present only on the transfer information recording sectors, and not on the other portions.

Also, the present invention provides a method for magnetic transfer to transfer recording information to a magnetic recording medium, said method comprising the steps of providing a master carrier for magnetic transfer and a slave medium, and for bringing said master carrier and said slave medium into contact with each other, whereby said master carrier for magnetic transfer comprises a plurality of transfer information recording sectors with recording information for transfer magnetized thereon and being formed on a substrate, a space or a non-magnetic sector being provided on each of adjacent transfer information recording sectors, surface hardness of each of said transfer information recording sectors is not lower than 20 GPa, and a diamond-like carbon protective film of 3 to 30 nm in thickness is provided on the surface of the master carrier, and said slave medium has surface hardness of not lower than 1 GPa and has flexibility.

The present invention also provides a master carrier for magnetic transfer, which comprises a magnetic layer on a portion corresponding to information signal on the substrate surface, and a method for magnetic transfer by bringing the slave medium to receive transfer into contact with the master carrier and by applying magnetic field for transfer, wherein relationship between coercive force Hcs of the slave magnetic recording medium and the magnetic field for transfer is:

The present invention also provides the method for magnetic transfer as described above, wherein coercive 10 force Hc of the master carrier for magnetic transfer is not more than 600 Oe, and coercive force of the slave medium to receive magnetic transfer is not less than 1500 Oe.

DETAILED DESCRIPTION OF THE PREFERRED EMBODIMENTS

The present invention solves the problems in a recording method, by which recorded information on projections (convex portions) of a master carrier having projections and recesses (convex and concave portions) is transferred to a slave medium.

The method to transfer magnetic information on projected convex portions of the master carrier for magnetic transfer is a very superior method having excellent features such as capability to transfer within shorter time compared with a conventional method using a master carrier for magnetic transfer, which is formed by magnetization of a part of a ferromagnetic substance having high coercive force on a plane. However, it has been unavoidable that angular portions of information recording area may be damaged or recording may be lost. The present inventors have found that such problems are caused by the fact that component members of a magnetic layer such as lubricant on the surface of the slave medium, or by dust or dirt are attached on projected or convex portions, and this leads to formation of gap between the master recording medium and the slave medium and to the difficulty of recording due to spacing loss. Also, it has been found that the damage of the surface of the slave medium is caused by the contact with angular portions of projections of the master carrier for magnetic transfer. As a result, the present inventors have finally conceived the present invention.

In the following, description will be given on the features of the present invention referring to the attached drawings.

Figure 1:
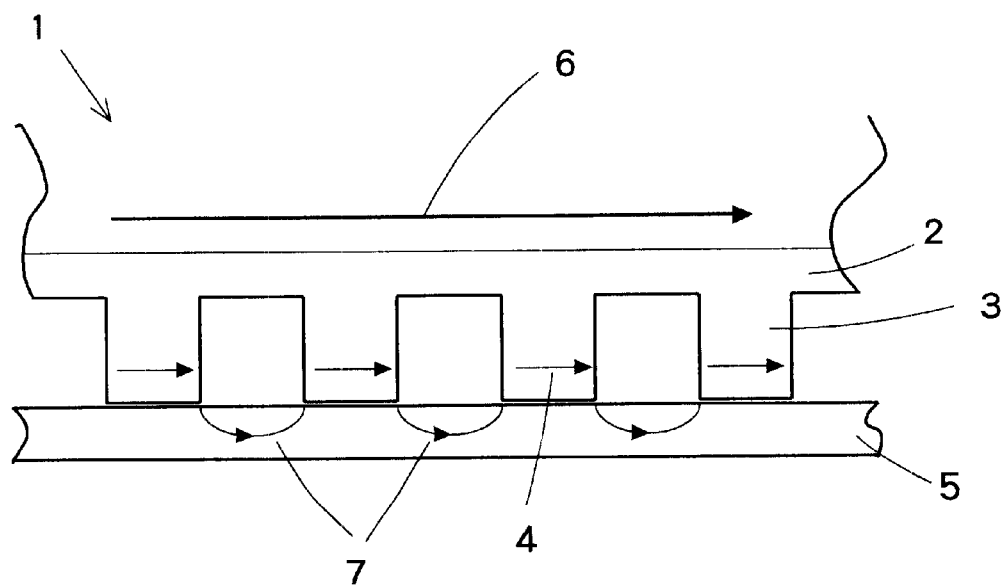
FIG. 1 is a drawing to explain a method of transfer from a conventional type master carrier for magnetic transfer to a slave medium.

FIG. 1 is a drawing to explain a method to transfer information from a conventional type master carrier for magnetic transfer to a slave medium.

On a master carrier 1 for magnetic transfer, a ferromagnetic thin film 2 is formed, and projections 3 formed to comply with preformat are provided on the surface of the ferromagnetic thin film. When the projections 3 of the master carrier are brought into contact with the surface of a slave medium 5 and an exciting magnetic field 6 is applied, the projections 3 are magnetized in its direction. On the slave medium 5, a recording magnetic field 7 is formed in response to magnetization 4 of the projections of the master carrier for magnetic transfer, and preformatting of the slave medium is carried out.

Figure 2:
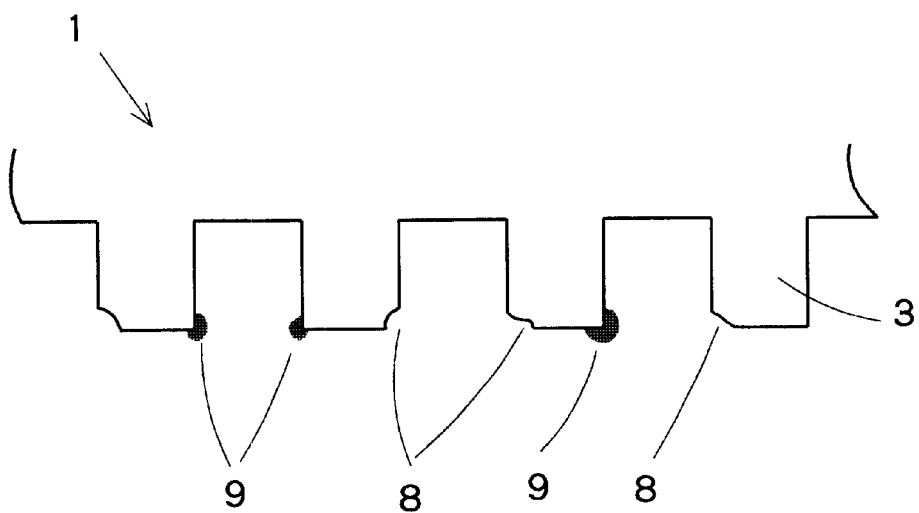
FIG. 2 is a drawing to explain a master carrier for magnetic transfer after transfer has been performed by a multiple of times.

However, when transfer operation is performed by a multiple of times using the master carrier for magnetic transfer by the method as described above, problems as given below occur on the master carrier for magnetic transfer as shown in FIG. 2.

FIG. 2 is a drawing to explain the master carrier for magnetic transfer after transfer operation has been performed by a multiple of times.

When transfer operation is performed by a multiple of times using the master carrier 1 for magnetic transfer, angular portions 8 of the projections 3 are often broken due to multiple times of contacts with the information recording medium, or because solid objects 9 are generated from scraping of component members of the information recording medium or from wearing of the projections or because dust, dirt, etc. in the atmosphere may be attached at the angular portions 8 of the projections 3.

As a result, magnetized pattern of information on the angular portions of the projections may not be transferred accurately and disturbance may occur on the magnetized angular portions or distance between the projections and the slave medium may be increased due to the attached solid objects, and this may lead to trouble or missing of recording on the slave medium.

These problems usually occur as follows: When the master carrier for magnetic transfer is brought into contact with the slave medium, slight deviation may occur between the master carrier and the slave medium, and the surface of the slave medium may be scraped off by the angular portions of the projections of the master carrier for magnetic transfer. As a result, the lubricant on the magnetic layer on the surface of the slave medium may be scraped off, and a part of the projections of the master carrier for magnetic transfer may be broken or damaged.

These structural problems caused by the formation of projections and recesses with magnetization on the master carrier for magnetic transfer are solved according to the present invention by such an arrangement that non-magnetic substances are placed between the projections made of ferromagnetic substance, and the surfaces of the projections and the surfaces of the non-magnetic substances are positioned substantially on the same plane.

Figure 3:
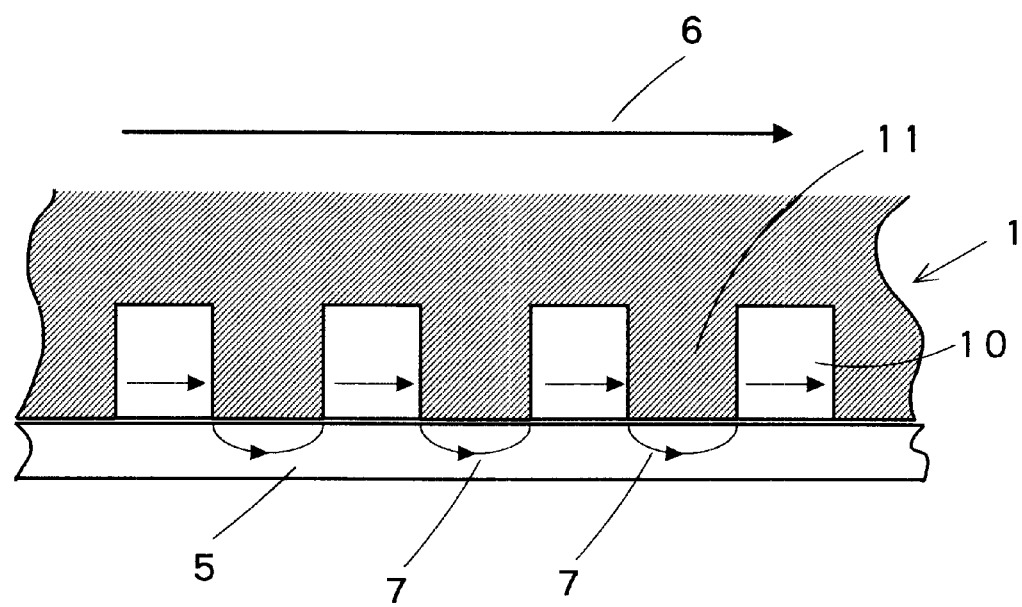
FIG. 3 is a drawing to explain a master carrier for magnetic transfer according to the present invention and a method for transfer of recorded information to a slave medium using the master carrier, and it is a cross-sectional view in a direction of recording track running perpendicularly to the surface of the master carrier for magnetic transfer.

FIG. 3 is a drawing to explain a master carrier for magnetic transfer according to the present invention and a method to transfer recorded information to the slave medium using the master carrier, and it is a cross-sectional view in a direction of recording track running perpendicularly to the surface of the master carrier for magnetic transfer.

On a master carrier 1 for magnetic transfer, transfer information recording sectors 10 made of ferromagnetic substance complying with the preformat are formed and non-magnetic sectors are arranged between the ferromagnetic magnetized sectors. The transfer information recording sectors 10 and the non-magnetic sectors 11 of the master carrier are substantially positioned on the same plane.

Being positioned substantially on the same plane in the present invention means that irregularities between the portions with magnetic layers and the portions without magnetic layer have thickness difference of not more than 30 nm, or more preferably, not more than 10 nm.

It is preferable that cross-section in a direction of track running perpendicularly to the surface of the master carrier for magnetic transfer in the present invention is in rectangular shape. In case it is in rectangular shape, the boundary with the non-magnetic sector is defined by a plane which is perpendicular to the surface of the master carrier for magnetic transfer. As a result, on the transfer magnetic field formed on the slave medium, no trouble occurs such as the damage of angular portions of the information recording area or missing of the record, and it is possible to perform the preformatting with very high accuracy. In the present invention, square shape is included in the meaning of the rectangular shape.

When the master carrier for magnetic transfer of the present invention is brought into contact with the slave medium 5, and an exciting magnetic field 6 such as DC magnetic field is applied to excite the transfer information recording sectors 10, precise preformatting of the slave medium can be carried out.

In the explanation for FIG. 3, description has been given on a method of magnetic transfer to magnetize the slave medium in intra-surface (or inward) direction. However, if the exciting magnetic field is applied in a direction perpendicular to the slave medium when the master carrier and the slave medium are in contact with each other, it is possible to magnetize the slave medium in perpendicular direction.

In the master carrier for magnetic transfer of the present invention, there are no surface irregularities. Accordingly, when it is brought into contact with the slave medium, there is no possibility that the surface of the slave medium is scraped off or the transfer information recording sectors of the master carrier are damaged even when the master carrier and the slave medium may be slightly deviated from each other, and no problem occurs such as the deterioration of quality of preformat even when transfer operation is carried out by a multiple of times.

Next, description will be given on a method to manufacture the master carrier for magnetic transfer of the present invention in connection with the attached drawings.

Figure 4:
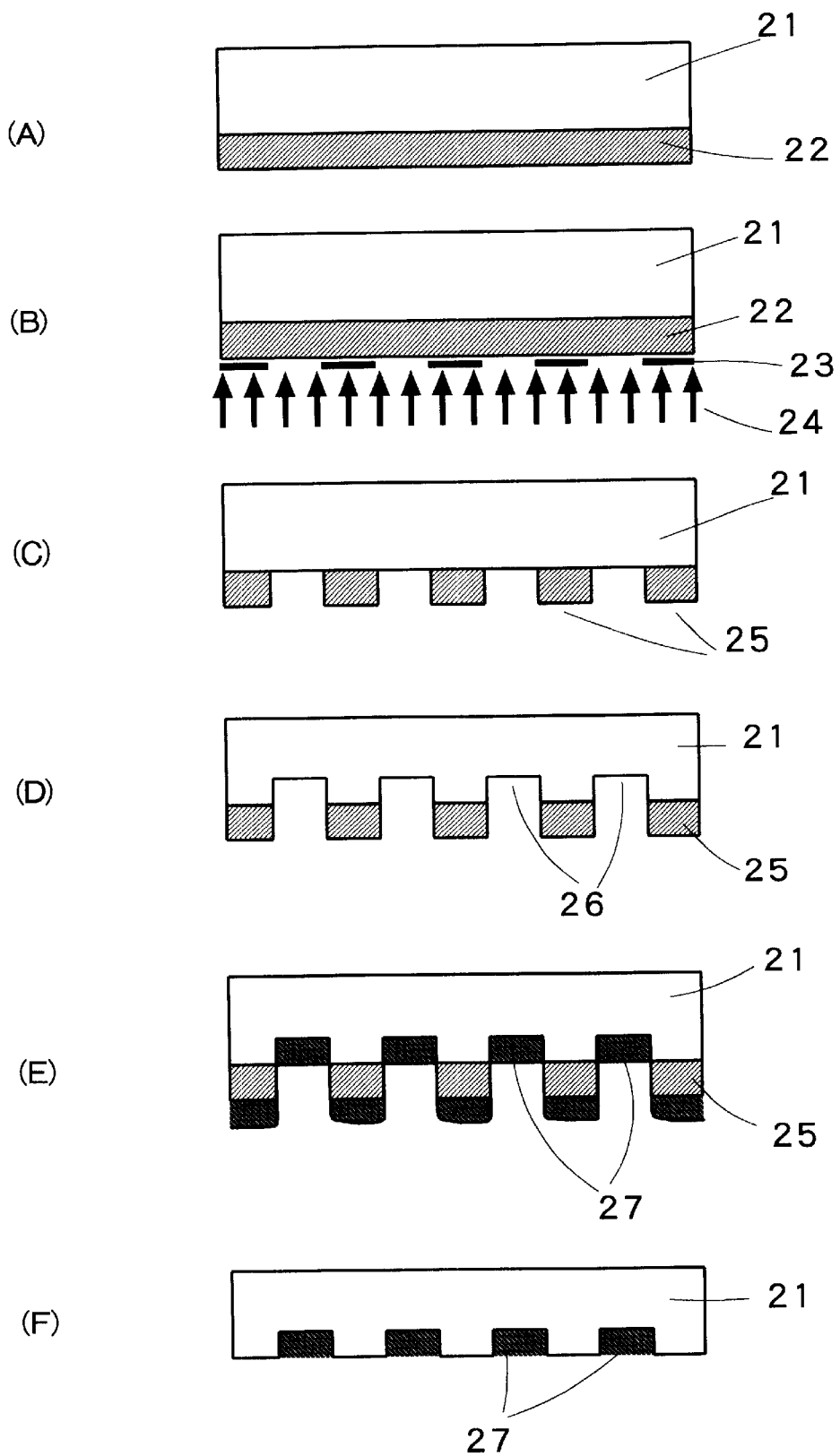
FIGS. 4(A)–(F) represents drawings to explain a method for manufacturing the master carrier for magnetic transfer according to the present invention in the order of manufacturing processes.

FIG. 4 represents drawings to show a method to manufacture the master carrier for magnetic transfer of the present invention in the order of manufacturing processes.

As shown in FIG. 4(A), a photoresist 22 is coated on a substrate 21 with smooth surface. As the substrate 21, a planar member with smooth surface may be used, i.e. silicon, quartz plate, glass, or non-magnetic metal or alloy such as aluminum, etc. or ceramics, synthetic resin, etc. may be used which has enough resistance to processing conditions such as temperature in etching and film-forming processes.

Any type of photoresist can be used, which is suitable for the processes such as etching.

As shown in FIG. 4(B), light exposure 24 is performed using a photo mask suitable for pattern of the preformat.

Next, as shown in FIG. 4(C), development is performed, and a pattern 25 corresponding to the information of preformat is formed on the photoresist 22.

Then, as shown in FIG. 4(D), holes 26 with predetermined depth corresponding to the pattern are formed on the substrate by etching means suitable for the substrate such as reactive etching, physical etching, etching using etching fluid, etc. in the etching process.

The depth of each hole should be the depth to match the thickness of the magnetic layer, which is formed as the transfer information recording sector, and it is preferably between 20–1000 nm. If it is too thick, it is not desirable because extending width of the magnetic field is increased.

It is preferable that the holes have uniform depth so that a plane in parallel to the surface of the substrate is formed on the bottom surface.

Also, it is preferable that each hole is designed in such shape that cross-section in a direction of track perpendicular to the surface is in rectangular shape.

Next, as shown in FIG. 4(E), magnetic material layers 27 are formed up to the surface of the substrate in a thickness corresponding to the hole by vacuum film-forming method and plating method such as vacuum evaporation method, sputtering method, ion plating method, etc. Magnetic characteristics of the transfer information recording sectors should be as follows: coercive force (Hc) is not more than 2500 Oe, or more preferably 5–1500 Oe, and saturation magnetic flux density (Bs) is 0.3 Tesla or more, or more preferably 0.5 Tesla or more.

Next, as shown in FIG. 4(F), the photoresist is removed by lift-off method. The surface is polished to remove burr and to flatten the surface.

In the above, description has been given on a method to form holes on the substrate and to form magnetic material films in the holes. It may be performed in such manner that, after magnetic material film is placed at predetermined points on the substrate to provide projections of the transfer information recording sectors, non-magnetic material films may be formed between the projections and the surfaces of the transfer information recording sectors, and the non-magnetic material sectors may be designed on the same plane.

As the magnetic material to be used in the transfer information recording sectors in the present invention, cobalt, iron or their alloy having high magnetic flux density may be used. More concretely, Co, CoPtCr, CoCr, CoPtCrTa, CoPtCrNbTa, CoCrB, CoNi, Fe, FeCo, FePt, FeNi, CoNb, FeSiAl, FeTaN, etc. may be used.

In particular, it is preferable that the magnetic material has high magnetic flux density and has magnetic anisotropy in the same direction as the slave medium, i.e. in intra-surface direction in case of intra-surface recording and in vertical direction in case of vertical recording. Also, it is preferable that the magnetic material has magnetic particle structure or amorphous structure because this contributes to the formation of sharp edge.

To provide the magnetic material with magnetic anisotropy, it is preferable to provide non-magnetic underlayer, and crystal structure and lattice constant must be the same as those of the magnetic layer. More concretely, as such an underlayer, Cr, CrTi, CoCr, CrTa, CrMo, NiAl, Ru, etc. may be formed in film by sputtering.

On the master carrier for magnetic transfer and the slave medium of the present invention, it is preferable that the transfer information recording sector has sufficient hardness with the formation of diamond-like carbon protective film to prevent damage of the transfer information recording sector 10, and the hardness is preferably 10 GPa or more, or more preferably 20 GPa. If it is lower than 10 GPa, it is not desirable because durability decreases.

Further, to provide the protective film on the surface of the magnetic layer of the master carrier for magnetic transfer, diamond-like carbon protective film may be formed by plasma CVD method using carbon-containing compound, e.g. alkane such as methane, ethane, propane, butane, etc., or alkene such as ethylene, propylene, etc., or alkyne such as acetylene, etc. as raw material. In this case, it is desirable that negative voltage of 50–400 V is applied on the substrate.

The carbon protective film has preferably a thickness of 3–30 nm, or more preferably 5–10 nm.

Further, it is preferable that lubricant is present on the protective film. As the lubricant, it is preferable to use organic fluorine compound containing perfluoroalkyl group. The thickness of the lubricant is preferably 1–10 nm.

In particular, in case lubricant is provided, it is possible to prevent the decrease of durability caused by friction which occurs when the master carrier for magnetic transfer is brought into contact with the slave medium.

When damage of the surface of the master carrier for magnetic transfer and the transferred magnetic recording medium caused by the attachment of dust on the surface of the master carrier or gap between the master carrier and the magnetic recording medium can be prevented, it is possible to accurately carry out transfer of the recording information.

In case a master carrier for magnetic transfer is used which has ferromagnetic layers only on the projections, magnetized pattern without disturbance can be transferred onto the slave medium. However, when transfer operation is repeated by a multiple of times, the transfer pattern may be damaged.

Such problems occur due to gathering of the dust from the surrounding as the result of electric charge caused by repeated contact between the master carrier and the slave medium.

That is, the master carrier for magnetic transfer is manufactured by the technique of photolithography, and the material suitable for film formation under etching and vacuum conditions such as glass, quartz, silicon, etc. is used as the substrate of the master carrier for magnetic transfer.

These materials have low conductivity, and the slave medium has also low conductivity because it is generally formed on a substrate made of synthetic resin. As a result, when the master carrier for magnetic transfer is brought into contact with the slave medium by a multiple of times, the master carrier for magnetic transfer is electrically charged. Then, dusts from the atmospheric air are attached to projections of the master carrier for magnetic transfer due to the action of static electricity and spacing loss may occur between the master carrier for magnetic transfer and the slave medium, or projections may be damaged due to the dusts attached as the result of contact between the master carrier and the slave medium, or the slave medium may be damaged.

As a result, magnetization on the angular portions of the projections may not be transferred accurately or disturbance may occur on the magnetized angular portions. Or, distance between the projections and the slave medium may be increased by the attached solid objects, and this may lead to the missing of the record on the slave medium.

In this connection, in the master carrier for magnetic transfer of the present invention, problems such as the attachment of dust caused by electric charging of the master carrier for magnetic transfer are solved by the formation of a non-magnetic conductive layer between the substrate and the magnetic layer.

Figure 5:
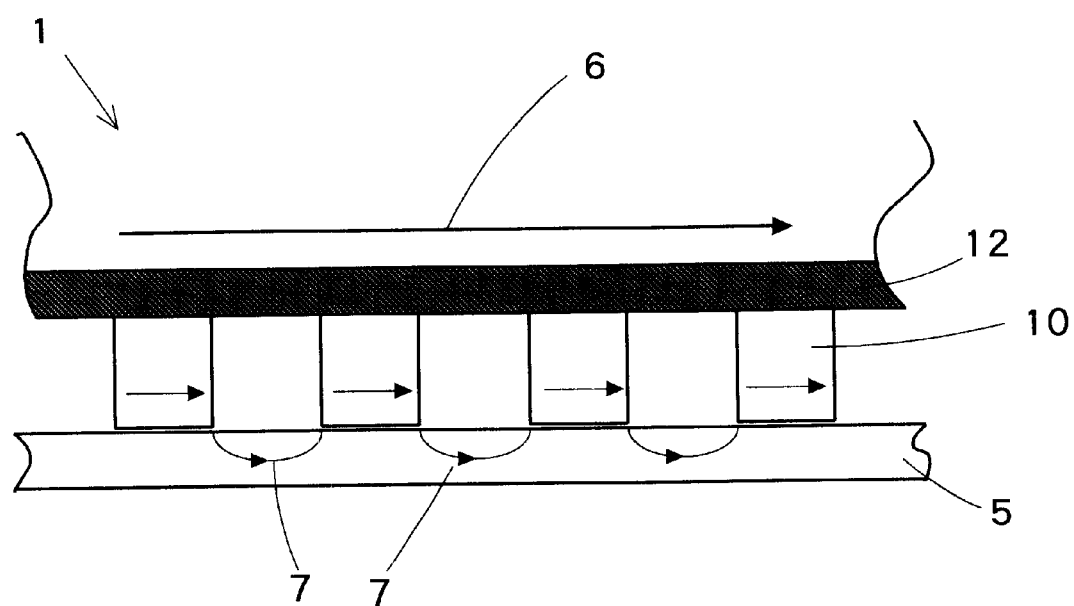
FIG. 5 is a drawing to explain a master carrier for magnetic transfer according to the present invention and a method for transfer of recorded information to a slave medium using the master carrier, and it is a cross-sectional view in a direction of recording track running perpendicularly to the surface of the master carrier for magnetic transfer.

FIG. 5 is a drawing to explain a master carrier for magnetic transfer of the present invention and a method of transfer to transfer recorded information to a slave medium using the master carrier, and it shows a cross-section in a direction of recording track running perpendicularly to the surface of the master carrier for magnetic transfer.

On a master carrier 1 for magnetic transfer, a conductive layer 12 is formed, and transfer information recording sectors 10 made of ferromagnetic substance to correspond to the preformat are formed on the conductive layer.

When the master carrier for magnetic transfer of the present invention is brought into contact with a slave medium 5 and an exciting magnetic field 6 such as DC magnetic field is applied to excite the transfer information recording sectors 10, precise preformatting of the slave medium is carried out.

As already described in connection with FIG. 4, it is preferable that a carbon protective film is formed on the surface of the transfer information recording sectors.

In the explanations for FIG. 5, description has been given on a method of magnetic transfer to magnetize the slave medium in intra-surface direction. If the exciting magnetic field is applied in a direction perpendicular to the slave medium when the master carrier and the slave medium are in contact with each other, it is possible to magnetize the slave medium in perpendicular direction.

In the master carrier for magnetic transfer of the present invention, there is non-magnetic conductive layer between the substrate and the magnetic layer, and this increases conductivity of the master carrier for magnetic transfer. As a result, even when the master carrier for magnetic transfer is brought into contact with the slave medium, charging with static electricity does not occur to full extent, and dust is not accumulated on the transfer information recording sectors. This means that no spacing loss occurs or no damage occurs on the master carrier for magnetic transfer or on the slave medium.

Next, description will be given on a method to manufacture the master carrier for magnetic transfer of the present invention in connection with the drawings.

Figure 6:
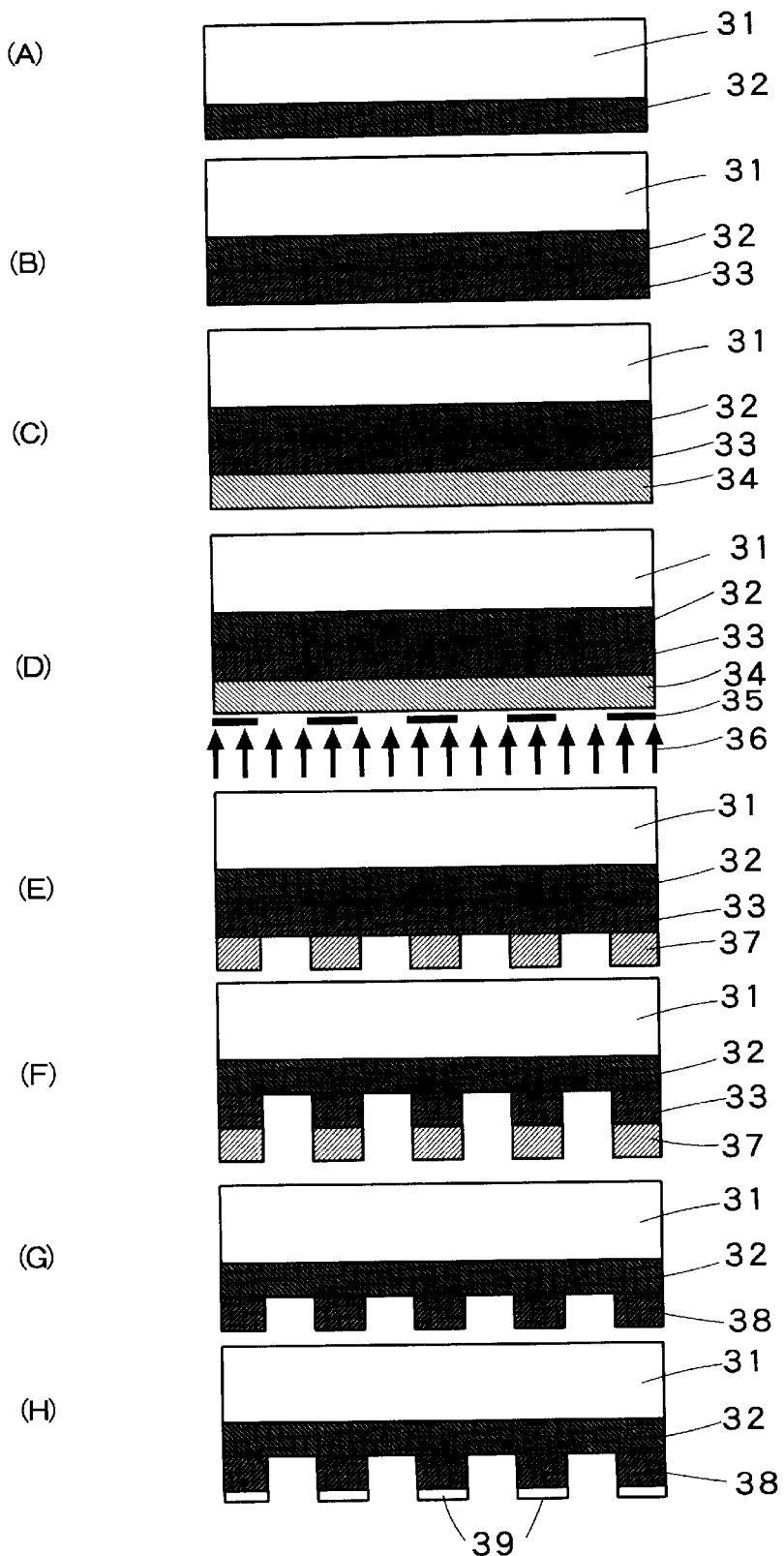
FIGS. 6(A)–(H) represents drawings to explain a method for manufacturing the master carrier for magnetic transfer in the order of manufacturing processes.

FIG. 6 represents drawings to explain a method to manufacture the master carrier for magnetic transfer of the present invention in the order of manufacturing processes.

As shown in FIG. 6(A), a non-magnetic conductive layer 32 is formed on a substrate 31 with smooth surface.

Next, as shown in FIG. 6(B), a magnetic layer 33 is formed by the formation of film of magnetic material on the non-magnetic conductive layer by means such as sputtering, vacuum deposition, plating, etc.

Further, as shown in FIG. 6(C), a photoresist 34 is coated on the magnetic layer. As the photoresist, positive type or negative type may be used.

Then, as shown in FIG. 6(D), light exposure 36 is performed on the photoresist 34 using a photo mask 35 to match the pattern of the preformat.

As shown in FIG. 6(E), development is performed, and a resist pattern 37 corresponding to the information of the preformat is formed on the photoresist 34.

Next, as shown in FIG. 6(F), etching of the magnetic material is carried out to match the resist pattern.

Then, as shown in FIG. 6(G), the photoresist is removed, and a magnetic layer for transfer 38 is formed.

Further, as shown in FIG. 6(H), a protective film 39 to protect the surface of the magnetic layer is formed on the magnetic layer for transfer. Then, uniform magnetic field is applied for magnetization.

In FIG. 6, description has been given on a method to manufacture by removing unnecessary magnetic material from the formed magnetic layer by etching. However, it may be performed in such manner that, after forming the photoresist pattern on the non-magnetic conductive layer, the magnetic layer may be provided by film-forming means such as sputtering, and the magnetic layer may be formed on a portion not covered with the photoresist.

As the substrate 31 of the master carrier for transfer, a planar material with smooth surface such as silicon, quartz plate, glass, non-magnetic metal or alloy such as aluminum, ceramics, synthetic resin, etc. and a material resistant to processing conditions such as temperature during etching and film-forming processes may be used.

As the non-magnetic conductive layer 32, it is preferable to use non-magnetic metal layer, and a layer comprising Cr, Ti, Ta, Nb, etc. may be used. Also, a layer comprising non-magnetized alloy which has been non-magnetized through formation of alloy with magnetic metal such as Co, Fe, Ni, etc., or a layer comprising conductive particles and binder such as carbon black and non-magnetic metal may be used. Above all, it is preferable to use Co and Co-containing alloy.

As the non-magnetic conductive layer, it is preferable to form a layer which has resistivity of not more than $10^7$ $\Omega \cdot cm$, and not less than $10^5$ $\Omega \cdot cm$. If resistivity is lower than $10^7$ $\Omega \cdot cm$, sufficient anti-static effect cannot be obtained. The thickness of the non-magnetic conductive layer is preferably 10 nm or more, or more preferably 30 nm or more.

As the magnetic materials to be used in the magnetic layer of the present invention, the materials used as the transfer information recording sectors given in the explanations for FIG. 4 may be used.

The thickness of the magnetic layer is preferably 20–1000 nm, or more preferably 30–500 nm. If it is too thick, recording resolution may be decreased.

In the method to transfer magnetic information on the projections of the master carrier comprising projections and recesses, problems such as damage of angular portions of the information recording area or missing of recording are unavoidable, and this is caused by the problems of surface hardness, flexibility, etc. of the master carrier for magnetic transfer and the slave medium. By overcoming these problems, it is possible to contribute to the improvement.

Figure 7:
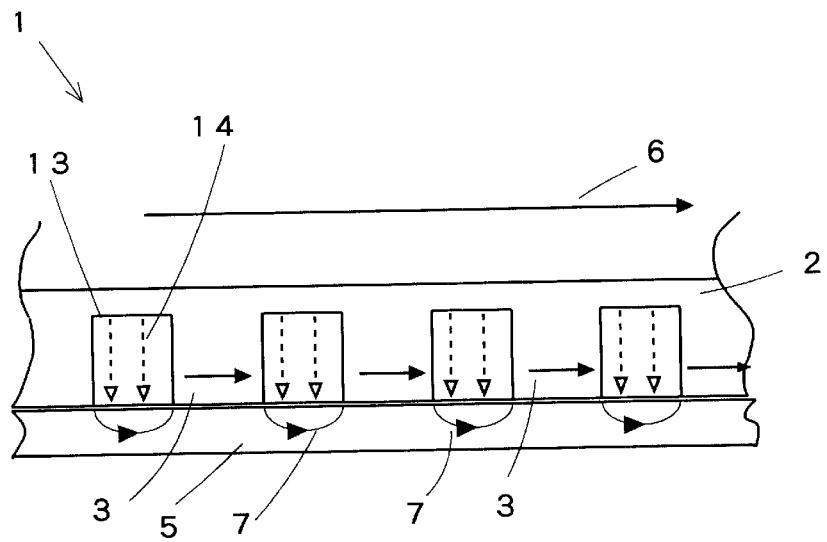
FIG. 7 is a drawing to explain a method for transfer from a conventional type master carrier for magnetic transfer to a slave medium.

FIG. 7 is a drawing to explain a method of transfer from a conventional type master carrier to a slave medium.

On a master carrier 1 for magnetic transfer, a ferromagnetic thin film 2 is formed, and projections 3 are formed to match the preformat on the surface of the ferromagnetic thin film. When the projections 3 of the master carrier for magnetic transfer are brought into contact with the surface of the slave medium 5 and an exciting magnetic field 6 is applied, a recording magnetic field 7 to match the projections 3 of the master carrier is formed on the slave medium 5, and the preformat of the slave medium is performed.

However, when transfer operation is performed by a multiple of times using the master carrier for magnetic transfer according to this method, disturbance may occur on edge of the transferred magnetic recording information or missing of record may occur, and it is difficult to transfer the information on a number of sheets.

The most important cause in this case is insufficient surface hardness of the master carrier for magnetic transfer. When the master carrier for magnetic transfer does not have sufficient hardness, a part of transfer pattern, in particular, the portion of edge, of the master carrier for magnetic transfer is damaged, and this leads to the damage of the shape of transferred pattern or disturbance. Also, fine power generated from the damaged portion enters between the master carrier for magnetic transfer and the slave medium, and there occurs gap between these two. As a result, magnetic field from the undamaged master carrier for magnetic transfer spreads, and this results in transfer image of lower resolution.

In the master carrier 1 for magnetic transfer as shown in FIG. 7, the magnetic layers of the projections 3 in contact with the slave medium 5 are integrated with the recesses. As a result, even when the projections are brought into contact with the slave medium 5 and transfer is performed, the difference of distance to the slave medium 5 from the recesses 13 or the projections 3 is relatively short. Thus, it is unavoidable that leaking magnetic force 14 of the recesses 13 adversely affects the slave medium, and disturbance may occur on the transferred magnetic recording information or the missing of record may be resulted.

In this respect, in the master carrier for magnetic transfer of the present invention, it is preferable that the magnetic layer is present only on the portion to be transferred and is not present on the other portion not to be transferred, and that the magnetic layer with uniform thickness is not formed on the surface of the substrate.

Figure 8:
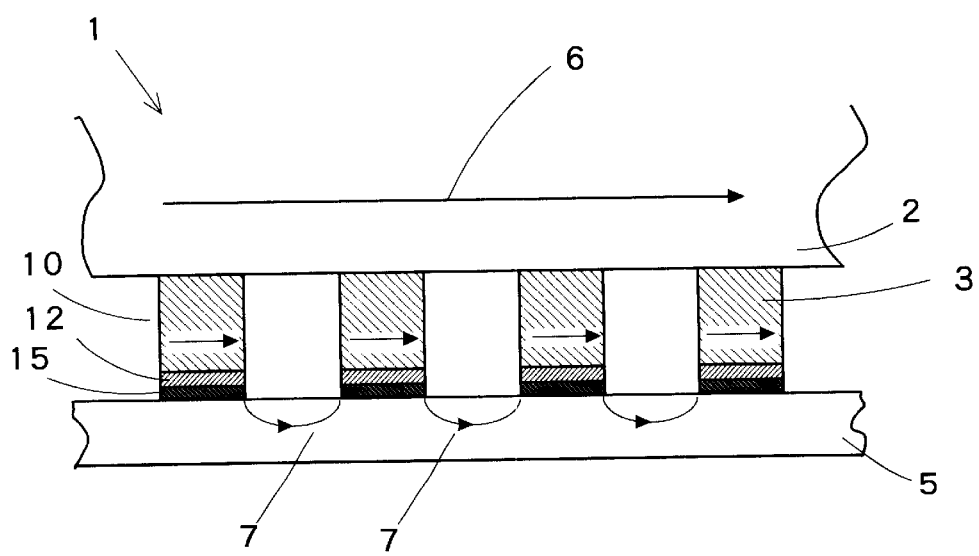
FIG. 8 is a drawing to explain a master carrier for magnetic transfer according to the present invention and a method for transfer of recorded information to a slave medium using the master carrier, and it is a cross-sectional view in a direction of recording track running perpendicularly to the surface of the master carrier for magnetic transfer.

FIG. 8 is a drawing to explain a master carrier for magnetic transfer of the present invention and a method to transfer recorded information to a slave medium using the master carrier, and it shows a cross-section in a direction of recording track running perpendicularly to the surface of the master carrier for magnetic transfer.

On a master carrier 1 for magnetic transfer, transfer information recording sectors 10 to correspond to the preformat made of non-magnetic material are formed. On the transfer information recording sectors 10, diamond-like carbon protective films 12 are provided, and lubricant layers 15 are formed on the diamond-like carbon protective films.

When the master carrier for magnetic transfer of the present invention is brought into contact with the slave medium 5 and an exciting magnetic field 6 such as DC magnetic field is applied to excite the transfer information recording sectors 10, precise preformat of the slave medium is carried out.

In the explanation for FIG. 8, description has been given on a method of magnetic transfer by magnetization of the slave medium in intra-surface direction. However, if the exciting magnetic field is applied perpendicularly to the slave medium when the master carrier and the slave medium are in contact with each other, it is possible to magnetize the slave medium in perpendicular direction.

It is preferable that the slave medium in contact with the master carrier for magnetic transfer has surface hardness of 1 GPa or more, or more preferably 2 GPa or more. Also, it is preferable that the diamond-like carbon protective film is formed in the same manner as the master carrier for magnetic transfer.

Also, it is preferable that the slave medium has high surface hardness so that it may not be damaged due to contact with the master carrier for magnetic transfer, and that it has high flexibility so that it comes into contact with the master carrier for magnetic transfer.

It is preferable that the slave medium to be used in the present invention comprises synthetic resin film as base material. More concretely, polyethylene terephthalate, polyethylene naphthalate, aramide, polyimide, polyphenylene benz-bisoxazole, etc. may be used.

In case the magnetic layer to be formed on the slave medium is made of ferromagnetic metal thin film, magnetic recording medium having high recording density can be obtained, while the magnetic layer may be formed by coating a composition, which contains ferromagnetic metal powder dispersed in a binder. In this case, it is possible to obtain a material having a predetermined hardness by adjusting type or quantity of abrasive to be mixed in the composition used for the formation of the magnetic layer.

In case the slave medium is formed from ferromagnetic metal thin film, it is preferable to form diamond-like carbon protective film on the surface of the magnetic layer, and further, to form a lubricant layer.

Next, description will be given on surface hardness in the present invention. In the present invention, surface hardness is expressed in micro-hardness.

In the normal method for measuring hardness such as the measurement of Vickers or Knoop hardness, i.e. the method by applying pressure with high load on the master carrier, it is not possible to find out the hardness in the preferred range.

The hardness can be measured by the following method: a pickup electrode having an indenter between two electrode plates is used, and force and displacement can be detected with high sensitivity using change of capacitance associated with the movement of the electrode.

To measure the hardness, a triangular cone is used, which has diamond tip angle of 90° and radius of curvature at tip of 35–50 nm, and this is forced into an object with a load of 5 $\mu$N at indenting rate of 2–4 nm/sec. A pressure of up to 5 $\mu$N is applied, and the pressure is gradually released. The maximum load of 5 $\mu$N is divided by area of projection of indenter contact sector, and this is defined as hardness.

The projection area is obtained by indentation test, and ⅓ of unloading curve of the depth-loading curve is linearly approximated. The point where this crosses depth axis is defined as contact depth of indenter contact sector. Hardness is obtained as a function of the contact depth depending on the shape of the indenter.

Using normal hardness measuring method, i.e. the method to measure hardness by applying high load into the medium (by more than 100 nm) as in the measurement of Vickers or Knoop hardness, it is not possible to find out hardness of the master carrier suitable for transfer.

More concretely, measurement can be made using Triboscope (Hysitron Inc.).

Next, description will be given on a method for manufacturing the master carrier for magnetic transfer of the present invention referring to the drawings.

Figure 9:
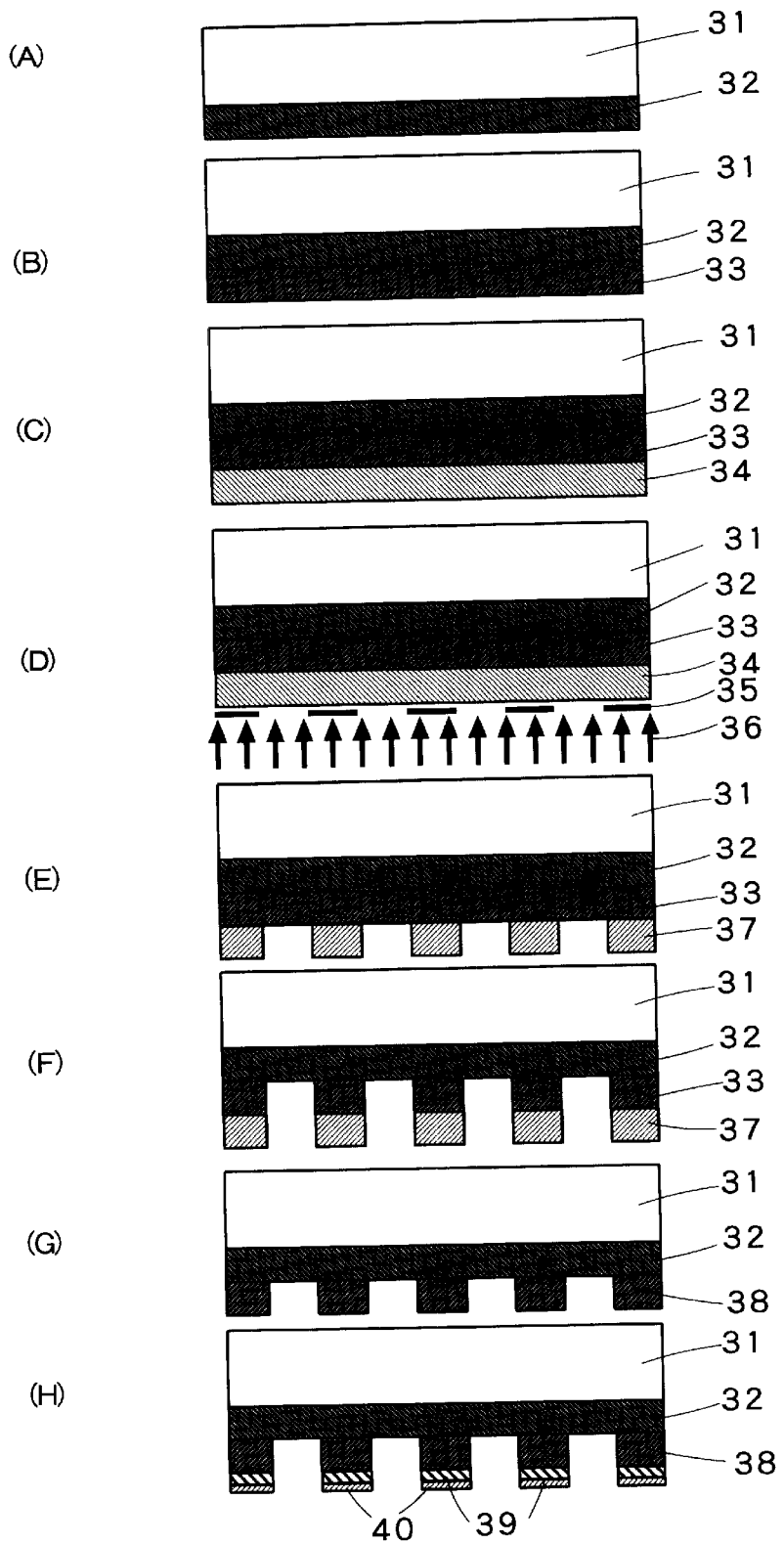
FIGS. 9(A)–(H) represents drawings to explain a method for manufacturing the master carrier for magnetic transfer according to the present invention in the order of manufacturing processes.

FIG. 9 represents drawings to explain a method for manufacturing the master carrier for magnetic transfer of the present invention in the order of manufacturing processes.

As shown in FIG. 9(A), a non-magnetic conductive layer 32 is formed on a substrate 31 with smooth surface.

Next, as shown in FIG. 9(B), film of magnetic material is formed on the non-magnetic conductive layer by means such as sputtering, vacuum deposition, plating, etc., and a magnetic layer 33 is formed.

Further, as shown in FIG. 9(C), a photoresist 34 is coated on the magnetic layer. As the photoresist, positive type or negative type may be used.

Then, as shown in FIG. 9(D), light exposure 36 is performed on the photoresist 34 using a photo mask 35 corresponding to the preformat pattern.

As shown in FIG. 9(E), development is performed, and a resist pattern 37 corresponding to information of the preformat is formed on the photoresist 34.

Next, as shown in FIG. 9(F), etching is performed on the magnetic material to match the resist pattern.

Then, as shown in FIG. 9(G), the photoresist is removed, and a magnetic layer for transfer 38 is formed.

Further, as shown in FIG. 9(H), a diamond-like carbon protective film 39 is formed on the surface of the magnetic layer. After providing a lubricant layer, uniform magnetic field is applied for magnetization.

In FIG. 9, description has been given on a method to manufacture by removing unnecessary magnetic material through etching of the magnetic layer, which was formed in advance. However, the magnetic layer may be formed in such manner that photoresist pattern is formed first on the non-magnetic conductive layer, and the magnetic layer is formed by film-forming means such as sputtering, and the magnetic layer may be formed on the portion not covered with the photoresist.

When the master carrier for magnetic transfer as described above is brought into contact with a slave medium, and a magnetic field for transfer is applied from outside, transfer is unstable and quality of signals may be partially decreased. Such decrease of signal quality may be caused by the application of inadequate magnetic field in addition to the reason such as adverse effect from the shape of the magnetic layer of the master carrier for magnetic transfer or the dust attached on the projections.

In the magnetic transfer from the master carrier to the slave medium, it has been generally believed as follows: When external magnetic field higher than coercive force Hcs of the slave medium is applied, the slave medium is magnetized all in the direction of the application of magnetic field, and this is the reason why the pattern to be transferred cannot be accurately recorded. For example, in JP-A-10-010544, in the paragraph 0064, it is described that the applied magnetic field is preferably equal to or lower than the coercive force of the magnetic recording medium.

However, in case transfer is performed by the method as described above, information signals may have lower quality, and servo operation may also become inaccurate.

Figure 10:
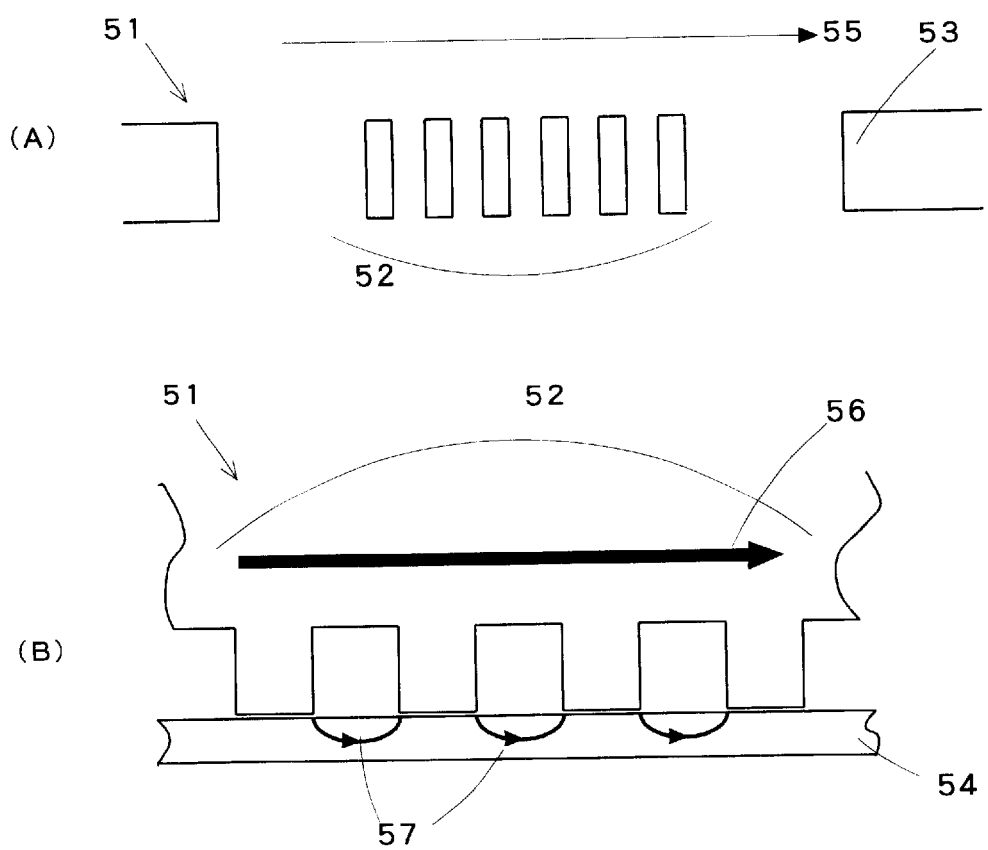
FIGS. 10(A)–(B) represents drawings to explain transfer of a pattern for preformat from a master carrier for magnetic transfer.

In connection with FIG. 10, description will be given now on the pattern for the preformat in the master carrier for magnetic transfer. FIG. 10(A) is a plan view schematically illustrating the surface of a magnetic layer of the master carrier for magnetic transfer, and FIG. 10(B) is a cross-sectional view to explain transfer process.

On a predetermined area of a track of the master carrier 51 for magnetic transfer, a preformat area 52 and a data area 53 are formed. On the preformat area 52, patterns of servo signals for tracking and address signals to be transferred are formed. When the master carrier 51 for magnetic transfer and the slave medium 54 are brought into contact with each other and an external magnetic field 56 for transfer is applied in tracking direction 55, the preformat information can be transferred to the slave medium as recording information 57. This makes it possible to efficiently produce the slave medium.

However, when transfer is performed by the above method, it has been known that quality of information signal may be deteriorated and servo operation may become inaccurate. This may be caused as follows: When transfer is performed from the master carrier for magnetic transfer to the slave medium, in the portion in contact with the slave medium, most of the magnetic field enters the pattern sector of the master carrier for magnetic transfer, and as a result, no conversion occurs even when magnetic field for transfer higher then Hcs is applied on the slave medium.

Moreover, there is the preferable intensity for the magnetic field, and by applying the magnetic field for transfer, which has intensity in specific relation to coercive force Hcs of the slave medium, it is possible to obtain a slave medium having signals of high quality.

In order to achieve clear and definite transfer in any transfer pattern, it should be designed in such manner that initial DC magnetization is performed on the slave medium by applying sufficiently high magnetic field compared with coercive force Hcs of the slave medium in one direction in advance, i.e. with magnetic field with intensity higher than Hcs, or more preferably by more than 1.2 times higher than Hcs, and also by applying the magnetic field for transfer of:

$0.6 \times Hcs \leq$ magnetic field for transfer $\leq 1.7 \times Hcs$ in a direction opposite to the direction of initial DC magnetization.

If the magnetic field for transfer is by 0.6 times lower than the coercive force Hcs of the slave medium, it is impossible to transfer the pattern. If it is by 1.7 times higher than Hcs, magnetization is performed with no relation to the pattern.

Coercive force of the magnetic field for transfer is more preferably 0.9 to 1.4 Hcs, or most preferably 1.0 to 1.3 Hcs.

Also, it is preferable that coercive force Hc of the master carrier for magnetic transfer is not more than 600 Oe, and coercive force of the slave medium to receive transfer is not less than 1500 Oe. If coercive force Hcs is too high, high magnetic field for transfer is needed, and this requires very large magnetic field generator. In this sense, it is preferably not more than 600 Oe. If coercive force Hc of the slave medium is lower, high density magnetic recording cannot be achieved, and it is preferably not less than 1500 Oe.

When magnetic recording information is transferred from the master carrier for magnetic transfer to the slave medium, it is preferable that the master carrier is brought into contact with the slave medium. To bring them into contact with each other, it is preferable that pressure is applied on a non-magnetic material such as aluminum plate with a rubber plate placed between the master carrier or the slave medium and the aluminum plate. It is effective to use a method to place the master carrier and the slave medium one upon another and to suck the air between these two under reduced pressure.

The master carrier for magnetic transfer according to the present invention can be used not only for transfer of magnetic recording information to a disk type magnetic recording medium such as hard disk, large capacity removal type magnetic recording medium, etc. but also for transfer of magnetic recording information to a card type magnetic recording medium or tape type magnetic recording medium.

In the above, description has been given on magnetic transfer from the master carrier for magnetic transfer to the slave medium, taking an example on the preformat. However, the present invention is not limited to the preformat, but it can also be applied to transfer of any type of magnetic recording information, and large amount of magnetic recording information can be accurately transferred within short time.

Also, there is no restriction to positional relationship of the master carrier and the slave medium, and the master carrier may be at upper position or at lower position. In the method for bringing these two into contact with each other, the slave medium may be placed on the master carrier and pressed on it, or contact may be achieved by suction of the air.

In the following, description will be given on embodiments of the present invention:

EXAMPLE 1—1

(Preparation of Master Carrier for Magnetic Transfer)

On the surface of a silicon substrate of 6 inches in diameter, photoresist was coated. After light exposure was performed using a mask, development was performed, and a pattern of the resist was formed.

Next, holes having uniform depth of 200 nm were prepared on the silicon substrate by reactive etching. Then, a chromium underlayer of 30 nm in thickness was formed by sputtering, and a film of FeCo was formed in thickness of 200 nm on the underlayer.

Next, after photoresist was removed by lift-off method, the surface was polished using polishing tape, and a master carrier for magnetic transfer was prepared. The ferromagnetic material thus obtained had coercive force (Hc) of 200 Oe.

(Preparation of Slave Medium)

An underlayer of CrTi alloy was formed in thickness of 60 nm on a polyimide substrate of 75 $\mu$m in thickness. On it, a recording layer of CoCrPt thin film was formed in thickness of 30 $\mu$m by sputtering. Further, a carbon protective film was formed on it in thickness of 10 nm by CVD method using methane/argon mixed gas. On the carbon protective film, a fluorine type lubricant was coated in thickness of 2 nm. The ferromagnetic material thus prepared had coercive force (Hcs) of 2500 Oe.

The master carrier for magnetic transfer prepared as above was cut into rectangular shape of 50 mm×20 mm. A slave medium was prepared by applying magnetic field of 6000 Oe in advance for DC magnetization in one direction, and this was brought into contact with the master carrier. Then, exciting magnetic field of 2300 Oe was applied in a direction opposite to magnetizing direction of the slave medium, and magnetic recording information was transferred from the master carrier to the slave medium.

An underlayer of CrTi alloy was formed in thickness of 60 nm on a polyimide substrate of 75 $\mu$m in thickness. On it, a recording layer of CoCrPt thin film was formed in thickness of 30 nm by sputtering. Further, a carbon protective film was formed on it in thickness of 10 nm by CVD method using methane/argon mixed gas. On the carbon protective film, a fluorine type lubricant was coated in thickness of 2 nm.

To achieve contact between the master carrier and the slave medium, pressure was applied on an aluminum plate with a rubber plate between the aluminum plate and the master carrier or the slave medium. After transfer operation of 10,000 times, the master carrier for magnetic transfer was not damaged, and transfer of high quality could be accomplished.

COMPARATIVE EXAMPLE 1—1

(Preparation of Master Carrier for Magnetic Transfer)

On the surface of a silicon substrate, a photoresist was coated, and pattern was formed by light exposure using a mask.

Next, holes with uniform depth of 200 nm were prepared on the silicon substrate and the photoresist was removed. Then, an underlayer of chromium was prepared in thickness of 30 nm by sputtering, and a magnetic layer on irregular surface was prepared by forming a film of FeCo in thickness of 200 nm on the underlayer. The ferromagnetic material thus prepared had coercive force (Hc) of 180 Oe.

(Transfer Test Method)

On the master carrier for magnetic transfer thus prepared, transfer test was performed by 10,000 times by the same procedure as in Example 1. As shown in FIG. 2, angular portions of the master carrier for magnetic transfer were damaged, and disturbance was found on angular portions of the slave medium.

EXAMPLE 2-1

(Preparation of Master Carrier for Magnetic Transfer)

On a glass substrate, a layer of CrTi was formed in thickness of 60 nm by sputtering. Then, a magnetic film having composition of Fe:Co=80:20 with coercive force (Hc) of 100 Oe was formed in thickness of 200 nm by sputtering.

Next, photoresist was coated, and light exposure was performed using a photo mask for preformat. Then, development was performed, and resist pattern was prepared.

Next, etching was carried out on the magnetic layer using ferric chloride solution of 50 weight %. Then, the photoresist was removed, and mixed gas of methane and argon (volume ratio 1:1) was passed. High frequency plasma was generated at vacuum degree of 2×10$^{-3}$ Torr. Then, negative voltage of 200 V was applied on the substrate, and a carbon protective film was formed in thickness of 5 nm.

(Preparation of Slave Medium)

On a polyimide substrate of 75 $\mu$m in thickness, CrTi film was formed in thickness of 60 nm by sputtering. Further, a CoPtCrTa film having coercive force (Hcs) of 2000 Oe was formed in thickness of 30 nm by sputtering, and a magnetic layer was prepared. The slave medium thus prepared was subjected to DC magnetization at 6000 Oe.

(Transfer Test Method)

On a magnetic surface of the slave medium as obtained above, magnetic surface of the master carrier for magnetic transfer was placed. Magnetic field of 1900 Oe was applied in a direction opposite to the magnetization of the slave medium, and magnetization on the master carrier was transferred to the slave medium. After transfer operation of 10,000 times by replacing the master carrier, the condition of the magnetization pattern transferred to the slave medium was examined under magnetic force microscope (MFM). Then, damaged condition on the surface of the master carrier for magnetic transfer was examined under light microscope. On the surface of the slave medium, satisfactory transfer pattern was observed. When the damaged condition of the surface of the master carrier was examined, there was almost no damage on the transferred image.

COMPARATIVE EXAMPLE 2-1

(Preparation of Master Carrier for Magnetic Transfer)

A magnetic layer was formed by the same procedure as in Example 2-1 except that CoCr film having coercive force (Hc) was formed in thickness of 200 nm directly on a glass substrate by sputtering, and a master carrier for magnetic transfer was prepared.

(Transfer Test Method)

Transfer test was performed on the master carrier for magnetic transfer prepared above, and this was examined by the same procedure as in Example 1. On a slave medium at 200th transfer operation, damage was observed on the transferred pattern.

EXAMPLE 3-1

(Preparation of Master Carrier for Magnetic Transfer)

On a glass substrate, CrTi film was formed as an underlayer in thickness of 60 nm by sputtering. Then, a magnetic film with composition of Fe:Co=80:20 having coercive force (Hc) of 100 Oe was formed in thickness of 200 nm by sputtering.

Next, photoresist was coated, and light exposure was performed using a photo mask for the preformat. Then, development was performed, and resist pattern was prepared.

Next, etching was carried out on the magnetic layer using ferric chloride solution of 50 weight %. The photoresist was removed and mixed gas of methane and argon at volume ratio of 1:1 was passed. High frequency plasma was generated at vacuum degree of $2\times10^{-3}$ Torr. Negative voltage of 200 V was applied on the substrate, and a carbon protective film was formed in thickness of 10 nm.

On the master carrier for magnetic transfer thus prepared, indentation was performed at indentation load of 5 $\mu$N at indentation rate of 3 nm/sec using a triangular cone with diamond tip angle of 90° and radius of curvature at tip of 40 nm. For the test, Triboscope (Hysitron Inc.) was used. Pressure up to 5 $\mu$N at maximum was applied, and the pressure was gradually released. Maximum load of 5 $\mu$N was divided by projection area of contact sector of the indenter, and hardness of 30 GPa was obtained.

(Preparation of Slave Medium)
(Transfer Test Method)

On a polyimide substrate of 75 $\mu$m in thickness, CrTi film was formed in thickness of 60 nm by sputtering. Further, CoPtCrTa film having coercive force (Hcs) of 2000 Oe was formed in thickness of 30 nm by sputtering, and a magnetic layer was prepared.

Next, a diamond-like carbon protective film was formed by sputtering, and surface hardness of the slave medium thus prepared was measured under the same measuring conditions as the master carrier for magnetic transfer. Surface hardness was 20 GPa. Next, DC magnetization was performed at 6000 Oe.

(Transfer Test Method)

The slave medium was brought into contact with the master carrier for magnetic transfer, and an external magnetic field of 1900 Oe was applied in a direction opposite to the magnetization of the slave medium. To bring the master carrier and the slave medium into contact with each other, pressure was applied on an aluminum plate, which was placed with a rubber plate between them. Transfer operation was performed by 10,000 times by replacing the master carrier, and condition of the magnetization pattern transferred to the slave medium was examined under magnetic force microscope (MFM), and damaged condition of the surface of the master carrier was examined under light microscope. Satisfactory transfer pattern was observed on the surface of the slave medium. When damaged condition on the surface of the master carrier was examined, almost no damage was found.

COMPARATIVE EXAMPLE 3-1

A master carrier for magnetic transfer and a slave medium were prepared by the same procedure as in Example 3-1 except that the carbon protective film was not formed. Transfer test was carried out by the same procedure as in Example 3-1, and condition of the surface was examined. Damage was detected on the surface of the master carrier for magnetic transfer and the transfer pattern was also damaged.

EXAMPLE 4-1

(Preparation of Master Carrier)

After pressure was reduced to $10^{-7}$ Torr at room temperature in a vacuum film-forming apparatus, argon was introduced to adjust the pressure to $3\times10^{-3}$ Torr. Then, a magnetic film with composition of Fe:Co=80:20 with thickness of 200 nm was formed on a silicon substrate, and this was used as the master carrier.

Coercive force Hc was 100 Oe, and magnetic flux density Bs was 23000 Gauss.

By etching, a pattern was formed, which had 10 sets of 10 $\mu$m-lines and spaces—a space of 100 $\mu$m—10 sets of 10 $\mu$m-lines and spaces.

(Preparation of Slave Medium)

After pressure was reduced to $10^{-7}$ Torr at room temperature in a vacuum film-forming apparatus, argon was introduced to adjust the pressure to $3\times10^{-3}$ Torr. Then, a glass plate was heated to 200° C., and CrTi film with thickness of 60 nm was prepared. Further, after CoPtCr film with 30 nm in thickness was prepared, a diamond-like carbon (DLC) protective film of 10 nm in thickness was formed, and this was used as the slave medium. Magnetic flux density was 4500 Gauss. Next, initial DC magnetization was performed on the slave medium at 4000 Gauss in advance in a direction opposite to that of the magnetic field for transfer as described below.

(Magnetic Transfer Test Method)

Each of a slave medium (A) having Hcs of 2500 Oe as prepared above, and a medium Zip 100 (manufactured by Iomega) (Hcs: 1600 Oe) was brought into contact with a master carrier. Magnetic field for transfer as shown in Table 1 or Table 2 was applied in a direction opposite to the magnetization of the slave medium. To bring the master carrier into contact with the slave medium, pressure was applied on an aluminum plate with a rubber plate between the master carrier or the slave medium and the aluminum plate.

The shape of the magnetized pattern on the slave medium was examined by magnetic development method as described below.

(Magnetic Development Method)

Magnetic developing solution (Sigma Marker Q; Sigma High Chemical) was diluted by 10 times and was dropped on the slave medium, and this was dried. The length of the developed pattern lines in the direction of cross-section was examined under microscope. The results are summarized in Table 1 and Table 2. Measurement was performed for each specimen, and average value is shown.

TABLE 1

| Slave medium | Coercive force | Intensity of magnetic field (Oe) | Ratio to Hcs | Cross-sectional length in magnetic development (relative ratio) |
|---|---|---|---|---|
| A | 2500 | 750 | 0.3 | 0.0 |
|   |      | 1250 | 0.5 | 0.0 |
|   |      | 1500 | 0.6 | 0.3 |
|   |      | 2000 | 0.8 | 0.6 |
|   |      | 2250 | 0.9 | 0.8 |
|   |      | 2500 | 1.0 | 1.0 |

TABLE 1-continued

| Slave medium | Coercive force | Intensity of magnetic field (Oe) | Ratio to Hcs | Cross-sectional length in magnetic development (relative ratio) |
|---|---|---|---|---|
| | | 2750 | 1.1 | 1.0 |
| | | 3000 | 1.2 | 1.0 |
| | | 3250 | 1.3 | 1.0 |
| | | 3500 | 1.4 | 0.9 |
| | | 3750 | 1.5 | 0.6 |
| | | 4000 | 1.6 | 0.3 |
| | | 5000 | 2.0 | 0.0 |

TABLE 2

| Slave medium | Coercive force | Intensity of magnetic field (Oe) | Ratio to Hcs | Cross-sectional length in magnetic development (relative ratio) |
|---|---|---|---|---|
| B | 1600 | 500 | 0.3 | 0.0 |
| | 700 | 0.4 | 0.0 | |
| | 1000 | 0.6 | 0.3 | |
| | 1200 | 0.8 | 0.8 | |
| | 1400 | 0.9 | 0.9 | |
| | 1600 | 1.0 | 1.0 | |
| | 1800 | 1.1 | 1.0 | |
| | 2000 | 1.3 | 1.0 | |
| | 2350 | 1.5 | 0.9 | |
| | 2500 | 1.6 | 0.6 | |
| | 2750 | 1.7 | 0.4 | |
| | 3000 | 1.9 | 0.1 | |
| | 3500 | 2.2 | 0.0 | |

As described above, when the master carrier for magnetic transfer of the present invention is used, it is possible to perform the preformat recording of signals such as servo signals for tracking, address information signals, reproducing clock signals, etc. on disk-like medium such as hard disk, large capacity removable disk medium, large capacity flexible medium, etc. within short time and with high productivity, and recording can be carried out with high accuracy for a multiple of times in stable manner. Also, in the magnetic transfer from the master carrier to the slave medium, it is possible to obtain a slave medium, which has transfer pattern of high quality regardless of the position and the shape of the pattern, by applying magnetic field for transfer having specific intensity to coercive force Hcs of the slave medium.

What we claim is:

1. A master carrier for magnetic transfer to transfer recording information to a magnetic recording medium, said master carrier comprises a plurality of transfer information recording sectors made of ferromagnetic substance corresponding to the recording information to be transferred and having the transfer information recording sectors formed over the circumference of the master carrier with spacing at a fixed angle, non-magnetic material sectors to define the transfer information recording sectors are present between adjacent transfer information recording sectors and surfaces of the non-magnetic material sectors are substantially positioned on and forming the same plane.

2. A master carrier for magnetic transfer according to claim 1, wherein thickness of each of the transfer information recording sectors is 20 to 1000 nm.

3. A master carrier for magnetic transfer according to claim 1, wherein said transfer information recording sector has coercive force (Hc) of not higher than 2500 Oe.

4. A master carrier for magnetic transfer according to claim 1, wherein said transfer information recording sector has saturation magnetic flux density (Bs) of not less than 0.3 T.

5. A master carrier for magnetic transfer to transfer recording information to a magnetic recording medium, said master carrier comprises a plurality of transfer information recording sectors made of ferromagnetic substance corresponding to the recording information to be transferred and being in form of projections on a substrate, and non-magnetic conductive layers formed between the transfer information recording sectors and the substrate.

6. A master carrier for magnetic transfer according to claim 5, wherein said conductive layer comprises non-magnetic metal.

7. A master carrier for magnetic transfer according to claim 6, wherein a protective film is formed on the surface of each of the transfer information recording sectors.

8. A master carrier for magnetic transfer according to claim 5, wherein a protective film is formed on the surface of each of the transfer information recording sectors.

9. A master carrier for magnetic transfer to transfer recording information to a magnetic recording medium, said master carrier comprises a plurality of transfer information recording sectors made of ferromagnetic substance corresponding to the recording information to be transferred and being formed on a substrate, a space or a non-magnetic sector is present between each of the adjacent transfer information recording sectors, surface hardness of each of the transfer information recording sectors is not lower than 20 GPa, and a diamond-like carbon protective film of 3 to 30 nm in thickness is provided on the surface.

10. A master carrier for magnetic transfer according to claim 9, wherein the ferromagnetic substance is present only on the transfer information recording sectors, and not on the other portions.

11. A method for magnetic transfer to transfer recording information to a magnetic recording medium, said method comprising the steps of providing a master carrier for magnetic transfer and a slave medium, and for bringing said master carrier and said slave medium into contact with each other, whereby said master carrier for magnetic transfer comprises a plurality of transfer information recording sectors with recording information for transfer magnetized thereon and being formed on a substrate, a space or a non-magnetic sector being provided on each of adjacent transfer information recording sectors, surface hardness of each of said transfer information recording sectors is not lower than 20 GPa, and a diamond-like carbon protective film of 3 to 30 nm in thickness is provided on the surface of the master carrier, and said slave medium has surface hardness of not lower than 1 GPa and has flexibility.

12. A method for magnetic transfer, comprising the steps of providing a master carrier for magnetic transfer having a magnetic layer on a portion corresponding to information signal on substrate surface and a slave medium to receive transfer, bringing said master carrier into contact with the slave medium, and applying magnetic field for transfer, whereby relationship between coercive force Hcs of the slave magnetic recording medium and the magnetic field for transfer is:

0.6×Hcs≦magnetic field transfer≦1.7×Hcs.

13. A method for magnetic transfer according to claim 12, wherein coercive force Hcs of the master carrier for magnetic transfer is not more than 600 Oe, and coercive force of the slave medium to receive transfer is not less than 1500 Oe.

14. A magnetic transfer method to transfer recording information to a magnetic recording medium, comprising a step of performing magnetic transfer by bringing the magnetic recording medium into close contact with a master carrier for magnetic transfer, said master carrier comprises a plurality of transfer information recording sectors made of ferromagnetic substance corresponding to the recording information to be transferred and having the transfer information recording sectors formed over the circumference of the master carrier with spacing at a fixed angle, non-magnetic material sectors to define the transfer information recording sectors are present between adjacent transfer information recording sectors, and surfaces of the transfer information recording sectors and surfaces of the non-magnetic material sectors are substantially positioned on and forming the same plane.

15. A magnetic transfer method according to claim 14, wherein thickness of the transfer recording information sectors is in the range of 20–1000 nm.

16. A magnetic transfer method according to claim 14, wherein each said transfer information recording sector has a coercive force (Hc) of not more than 2500 Oe.

17. A magnetic transfer method according to claim 14, wherein each said transfer information recording sector has saturation magnetic flux density (Bs) of not less than 0.3 T.

* * * * *